(12) United States Patent
Mizone et al.

(10) Patent No.: US 7,963,158 B2
(45) Date of Patent: Jun. 21, 2011

(54) TIRE DRIVING STIFFNESS MEASURING APPARATUS, TIRE DRIVING STIFFNESS MEASURING METHOD AND PREDICTIVE FUEL CONSUMPTION

(75) Inventors: Tetsuya Mizone, Saitama (JP); Emiko Mogi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 78 days.

(21) Appl. No.: 12/593,848

(22) PCT Filed: Mar. 26, 2008

(86) PCT No.: PCT/JP2008/055640
§ 371 (c)(1),
(2), (4) Date: Sep. 29, 2009

(87) PCT Pub. No.: WO2008/120620
PCT Pub. Date: Oct. 9, 2008

(65) Prior Publication Data
US 2010/0107751 A1    May 6, 2010

(30) Foreign Application Priority Data
Mar. 30, 2007    (JP) .................................. 2007-090907

(51) Int. Cl.
*G01M 17/02* (2006.01)
(52) U.S. Cl. ........................................................ 73/146
(58) Field of Classification Search .................. None
See application file for complete search history.

(56) References Cited

U.S. PATENT DOCUMENTS

| | | | | |
|---|---|---|---|---|
| 4,969,355 A | * | 11/1990 | Doi et al. .......................... | 73/146 |
| 2001/0015098 A1 | * | 8/2001 | Anno et al. ....................... | 73/146 |
| 2002/0011103 A1 | * | 1/2002 | Kimbara et al. ................. | 73/146 |
| 2006/0243042 A1 | | 11/2006 | Leska et al. | |
| 2010/0037686 A1 | * | 2/2010 | Kitagawa et al. ................ | 73/146 |
| 2011/0000292 A1 | * | 1/2011 | Yoshikawa et al. .............. | 73/146 |

FOREIGN PATENT DOCUMENTS

| | | |
|---|---|---|
| JP | 54-61592 A | 5/1979 |
| JP | 1114225 B | 5/1989 |
| JP | 06-129954 A | 5/1994 |
| JP | 2002-148150 A | 5/2002 |
| JP | 2007-078667 A | 3/2007 |

\* cited by examiner

*Primary Examiner* — Andre J Allen
(74) *Attorney, Agent, or Firm* — Arent Fox, LLP

(57) ABSTRACT

There are provided the tire motor 5 for increasing or decreasing the tire rotational frequency Nt while the tire 3 is being rotated around the tire rotational shaft 1, the rotational frequency measuring means 6 for measuring the tire rotational frequency Nt, the drum motor 11 for rotating the test drum 12 around the drum rotational shaft 14 at the constant drum speed Vd, the speed meter 15 for measuring the drum speed Vd, the load applying means 4 for pushing the tire 3 against the test drum 12 with the tire load Fz, the radial force load cell 2 for measuring the tire load Fz, the tangential force load cell 2 for measuring the tangential force Fx that is exerted on the tire 3, and the recording means for recording the measurement result of each of the drum speed Vd, the tire rotational frequency Nt, the tangential force Fx and the tire load Fz in association with every measurement time point during increasing or decreasing the tire rotational frequency.

3 Claims, 4 Drawing Sheets

FIG.3

| Measurement Cycle | Kx(N) | Number of Analysis Data | Correlation $R^2$ | Kx Coefficient |
|---|---|---|---|---|
| 1st | 203455 | 752 | 0.955 | 52.02 |
| 2nd | 187693 | 677 | 0.943 | 47.96 |
| 3rd | 196145 | 923 | 0.968 | 50.13 |
| 4th | 197009 | 970 | 0.952 | 50.39 |
| 5th | 202268 | 962 | 0.942 | 51.72 |
| 6th | 198871 | 1111 | 0.954 | 50.82 |
| 7th | 214967 | 612 | 0.949 | 54.96 |
| 8th | 196797 | 976 | 0.953 | 50.33 |
| Average | 199091 | | | 50.90 |

FIG.4

| Tire | Kx Coefficient | RRC | Kx Index | RRC Index | Actually Measured Fuel Consumption By Vehicle |
|---|---|---|---|---|---|
| A | 64.2 | 87 | 111.0 | 107.4 | 16.78 |
| B | 57.82 | 81 | 100.0 | 100.0 | 16.77 |
| C | 51.82 | 76 | 89.6 | 93.8 | 16.91 |
| D | 60.93 | 81 | 105.4 | 100.0 | 16.69 |
| E | 58.63 | 83 | 101.4 | 102.5 | 16.71 |
| F | 62.64 | 86 | 108.3 | 106.2 | 16.71 |
| G | 54.2 | 68 | 93.7 | 84.0 | 16.85 |
| H | 58.27 | 109 | 100.8 | 134.6 | 15.90 |
| I | 59.9 | 113 | 103.6 | 139.5 | 15.79 |
| J | 79 | 102 | 136.6 | 125.9 | 16.56 |
| K | 88.3 | 113 | 152.7 | 139.5 | 16.32 |

Predicted Fuel Consumption Mf = a × RRC(Index)+b/Kx Coefficient (Index)+c

Predicted Fuel Consumption Mf = a × RRC(Index) +c

TIRE DRIVING STIFFNESS MEASURING APPARATUS, TIRE DRIVING STIFFNESS MEASURING METHOD AND PREDICTIVE FUEL CONSUMPTION

CROSS-REFERENCE TO RELATED APPLICATION

This application is a National Stage entry of International Application No. PCT/JP2008/055640, filed Mar. 26, 2008, the disclosure of the prior application is hereby incorporated in its entirety by reference.

BACKGROUND OF THE INVENTION

1. Field of the Invention

The present invention relates to a tire driving stiffness measuring apparatus and a tire driving stiffness measuring method as well as a calculation method for prediction of fuel consumption using measured tire driving stiffness.

2. Description of the Related Art

Conventionally, a tire tester has been used, which carries out a performance test for a tire without actually mounting it to a vehicle so as to evaluate performance of the tire as a component of the vehicle (for example, see JP 1114225 B and JP 2002-148150 A. Meanwhile, an evaluation of fuel consumption by the cycles of the regulated drive of a vehicle is carried out on a vehicle where a tire is actually mounted, by using a measurement value obtained from a chassis dynamometer by applying a load equivalent to an actual running resistance.

Running resistance (force) generally consists of an air resistance (force) component and a mechanical resistance (force) component. It is understood that mechanical resistance (force) component chiefly includes rolling resistance (force) (RR). Thus, it has been considered that to reduce rolling resistance (force) (RR) of a tire serves as the most effective means for contributing to enhancement of fuel efficiency of a vehicle.

However, as results from careful analyses regarding contribution to fuel consumption of a tire, it has turned out that enhancement of tire driving stiffness serves for enhancing fuel efficiency as effectively as reduction of rolling resistance (coefficient) (RRC: rolling resistance coefficient). In addition, it has been turn out that fuel consumption of a tire could be predicted by using driving stiffness of the tire, as accurately as measuring fuel consumption of the tire actually mounted on a vehicle.

The present invention has an object to provide a tire driving stiffness measuring apparatus and a tire driving stiffness measuring method, as well as a calculating method for prediction of fuel consumption by using tire driving stiffness, as highly accurate as measuring fuel consumption of the tire actually mounted on a vehicle.

SUMMARY OF THE INVENTION

One aspect of the present invention provides a tire driving stiffness measuring apparatus including a tire rotational shaft that rotatably supports a tire assembled on a wheel; a tire motor for increasing or decreasing a tire rotational frequency while the tire is being rotated; a rotational frequency measuring means for measuring the tire rotational frequency; a test drum for rotating around a drum rotational shaft that is parallel to the tire rotational shaft; a drum motor for rotating the test drum at a constant drum speed; a speed meter for measuring the drum speed; a load applying means for pushing the tire against the test drum with a tire load applied in a direction from the tire rotational shaft toward the drum rotational shaft; a radial force load cell for measuring the tire load; a tangential force load cell for measuring a tangential force that is exerted on the tire in a direction orthogonal to both a direction from the tire rotational shaft toward the drum rotational shaft and a direction of the tire rotational shaft; and a recording means for recording a measurement result of each of the drum speed, the tire rotational frequency, the tangential force and the tire load. The tangential force is generated by increasing or decreasing the tire rotational frequency while the tire load is being applied against the tire, and during increasing or decreasing the tire rotational frequency, the drum speed, the tire rotational frequency, the tangential force and the tire load are measured respectively at plural discrete measurement time point, and the measured results thereof are recorded respectively in association with every measurement time point thereof.

According to the present invention, since it is possible to readout the drum speed, the tire rotational frequency, the tangential force Fx and the tire load in association with every measurement time point, the slip ratio Rs can be calculated based on the drum speed and the tire rotational frequency in association with every measurement time point. Then, a linear regression is performed on measured data, based on a formula: Fx=Kx×Rs+RR used for expressing the relation between the tangential force Fx and the slip ratio Rs in association with every measurement time point, so as to obtain the tire driving stiffness Kx. While applying the linear regression, the correlation $R^2$ can also be calculated, so that it is possible to determine whether or not a measured result is normal based on the correlation $R^2$, and thus the tire driving stiffness can be measured with preferable reproducibility.

Another aspect of the present invention provides a tire driving stiffness measuring method including rotatably supporting a tire around a tire rotational shaft; pushing the tire against a test drum with a tire load applied in a direction from the tire rotational shaft toward the drum rotational shaft that is parallel to the tire rotational shaft, and the test drum is rotatably supported around the drum rotational shaft; rotating the test drum at a constant drum speed; increasing or decreasing a tire rotational frequency while the tire is left rotating along with the test drum so as to generate an tangential force; during increasing or decreasing the tire rotational frequency, measuring the drum speed, the tire rotational frequency, the tangential force and the tire load respectively at plural discrete measurement time points; and recording the measured results thereof respectively in association with every measurement time point.

Since the drum speed, the tire rotational frequency, the tangential force Fx and the tire load are recoded in association with every measurement time point by using the tire driving stiffness measuring method of the another aspect of the present invention, so that the drum speed, the tire rotational frequency, the tangential force Fx and the tire load can be read out in association with every measurement time point. Thus, the slip ratio Rs can be calculated in association with every measurement time point, based on the drum speed and the tire rotational frequency. Then, a linear regression is performed on measured data, based on a formula: Fx=Kx×Rs+RR used for expressing the relation between the tangential force Fx and the slip ratio Rs in association with every measurement time point, so as to obtain the tire driving stiffness Kx. While applying the linear regression, the correlation $R^2$ can also be calculated, thus it is possible to determine whether or not a measured result is normal based on the correlation $R^2$, and accordingly, the tire driving stiffness can be measured with preferable reproducibility.

The tire driving stiffness measuring method according to the another aspect of the present invention is carried out for a plurality of the tires of different types respectively, wherein the drum speed, the tire rotational frequency, the tangential force Fx and the tire load are read out respectively in association with every measurement time point; for each of the tires of different types, a slip ratio Rs for each of the tires of the different types is calculated from the drum speed and the tire rotational frequency in association with every measurement time point; for each of the tires of different types, a linear regression is performed on measured data, based on a formula: Fx=Kx×Rs+RR used for expressing the relation between the tangential force Fx and the slip ratio Rs in association with every measurement time point, so as to obtain the tire driving stiffness Kx; for each of the tires of different types, the tire driving stiffness Kx is divided by an average of the tire load at every measurement time point, so as to calculate a Kx coefficient; for each of the tires of different types, an actually measured fuel consumption by vehicle Ms is measured through an actual measurement of the tire actually mounted on a vehicle; for each of the tires of different types, a linear regression is performed on measured data, based on a formula: Ms=a×RRC+b/(Kx coefficient)+c used for expressing a relation of the calculated Kx coefficient and a rolling resistance coefficient RRC obtained by a method complying with ISO/SAE with the actually measured fuel consumption by vehicle Ms, thereby to determine coefficients a, b, c; the Kx coefficient and the rolling resistance coefficient RRC are calculated for a new tire; and the Kx coefficient and the rolling resistance coefficient RRC obtained for the new tire, and the determined coefficients a, b, c are substituted into a formula: Mf=a×RRC b/(Kx coefficient)+c respectively, so as to calculate a predicted fuel consumption Mf for the new tire.

Since the drum speed, the tire rotational frequency, the tangential force Fx and the tire load are recorded respectively by using the above mentioned tire driving stiffness method, the drum speed, the tire rotational frequency, the tangential force Fx and the tire load can be read out respectively in association with every measurement time point. Accordingly, the slip ratio Rs can be calculated in association with every measurement time point, based on the drum speed and the tire rotational frequency. The linear regression is performed on measured data, based on the formula: Fx=Kx×Rs+RR used for expressing the relation between the tangential force Fx and the slip ratio Rs in association with every measurement time point, so as to obtain the tire driving stiffness Kx. The tire driving stiffness Kx is divided by average of the tire loads at every measurement time point, so as to calculate the Kx coefficient, so that the tire driving stiffness Kx can be normalized, which enables comparisons among the tires of different types. For each of the tires of different types, the actually measured fuel consumption by vehicle Ms is measured through an actual measurement of the tire actually mounted on a vehicle, and for each of the tires of different types, the linear regression is performed on measured data, based on the formula: Ms=a×RRC+b/(Kx coefficient)+c used for expressing the relation of the calculated Kx coefficient and the rolling resistance coefficient RRC obtained by a method complying with ISO/SAE with the actually measured fuel consumption by vehicle Ms, so as to determine coefficients a, b, c; thereby to determine the formula: Mf=a×RRC b/(Kx coefficient)+c for calculating the predicted fuel consumption Mf, (thereby to determine coefficients a, b, c). At this time, the linear regression is performed based on each of the above two formulas, and while applying the linear regression for each formula, the correlation $R^2$ can be calculated respectively, so that it is possible to determine whether or not measured results are normal, based on the correlations $R^2$, which enables calculation of the predicted fuel consumption with a high accuracy.

The present invention can provide a tire driving stiffness measuring apparatus and a tire driving stiffness measuring method that enables measurement of tire driving stiffness with preferable reproducibility, as well as a predicted fuel consumption calculation method for calculating predicted fuel consumption with high accuracy by using the tire driving stiffness.

BRIEF DESCRIPTION OF THE DRAWINGS

FIG. 3 is a table showing tire driving stiffness Kx, the number of analysis data, correlations $R^2$ and Kx coefficients that are obtained from plural measures of the tire driving stiffness.

FIG. 4 is a table showing a Kx coefficient, an RRC, a Kx index, an RRC index, an actually measured fuel consumption by vehicle for each of different tires.

DETAILED DESCRIPTIONS OF THE PREFERRED EMBODIMENT

Figure 1:
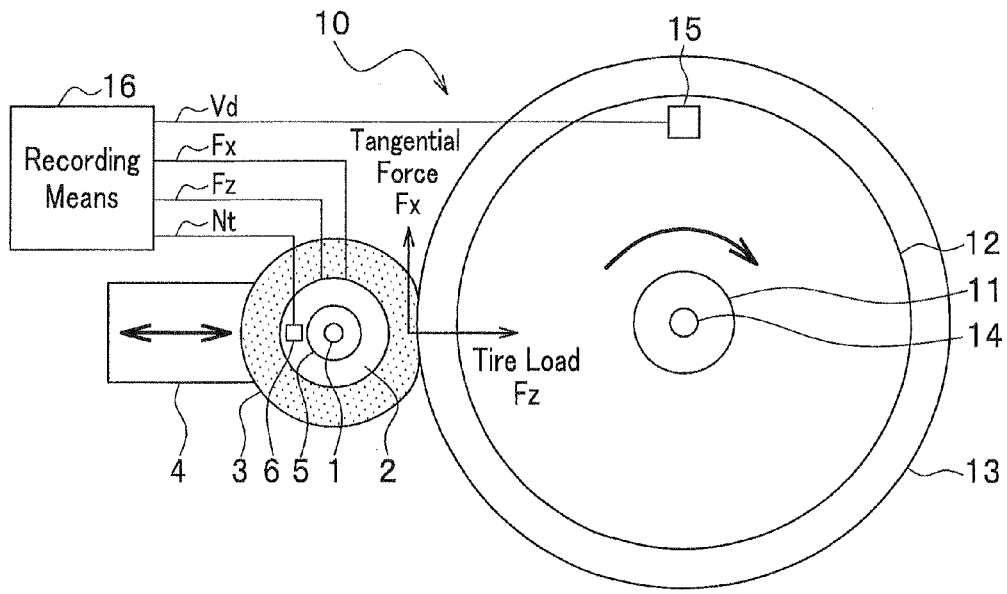
FIG. 1 is a schematic diagram of a tire driving stiffness measuring apparatus according to an embodiment of the present invention.

Detailed descriptions will be provided on an embodiment of the present invention with reference to drawings when necessary. Note that the same numerical references are used for the same components in the drawings, and repeated descriptions will be omitted.

FIG. 1 is a schematic diagram of a tire driving stiffness measuring apparatus 10 according to the embodiment of the present invention. The tire driving stiffness measuring apparatus 10 includes a tire rotational shaft 1 for rotatably supporting a tire 3; a tire motor 5 that increases or decreases a tire rotational frequency Nt (rpm) while the tire 3 is being rotated; a test drum 12 that rotates around a drum rotational shaft 14; a drum motor 11 that rotates the test drum 12 at a drum speed Vd (km/h); and a load applying means 4 that pushes a contact area of the tire 3 against the test drum 12 with a tire load Fz. The outer circumferential face of the test drum 12 may have a steel face as it has, or may be provided with a 3M's Safety-Walk™ road surface 13 thereon. The diameter of the test drum may preferably be 1.1 m to 3 m. The tire driving stiffness measuring apparatus 10 increases or decreases the tire rotational frequency Nt while applying the tire load Fz, thereby to generate an tangential force Fx. The tire rotational shaft 1 and the drum rotational shaft 14 are disposed parallel to each other, and both the tire rotational shaft 1 and the drum rotational shaft 14 are provided within a horizontal plane. The drum motor 11 can rotate the test drum 12 at a constant drum speed Vd. The rotational shaft of the tire motor 5 is coupled with the tire rotational shaft 1. The rotational shaft of the drum motor 11 is coupled with the drum rotational shaft 14. The load applying means 4 pushes the contact area of the tire 3 against the test drum 12 with the tire load Fz in a direction in parallel with a line connecting the tire rotational shaft 1 with the drum rotational shaft 14, specifically, in a direction from the tire rotational shaft 1 toward the drum rotational shaft 14.

The tire driving stiffness measuring apparatus 10 also includes a rotational frequency measuring means 6 and a speed meter 15 for measuring the drum speed Vd, and further includes a load cell 2 that includes a radial force load cell for measuring the tire load Fz, and an tangential force load cell for measuring the tangential force Fx exerted on the tire 3. Within a time of increasing or decreasing the tire rotational frequency Nt, the tire driving stiffness measuring apparatus 10 measures the drum speed Vd, the tire rotational frequency Nt, the tangential force Fx and the tire load Fz respectively at plural discrete measurement time points. The tangential force Fx is exerted on the tire 3 in a direction orthogonal to both the direction from the tire rotational shaft 1 toward the drum rotational shaft 14 and the direction along the tire rotational shaft 1.

The tire driving stiffness measuring apparatus 10 also includes a recording means 16 for recording measured results of the drum speed Vd, the tire rotational frequency Nt, the tangential force Fx and the tire load Fz. The tire driving stiffness measuring apparatus 10 records measured results of the drum speed Vd, the tangential force Fx and the tire load Fz measured respectively at plural discrete measurement time points while increasing or decreasing the tire rotational frequency Nt, in association with every measurement time point thereof. The tire rotational frequency Nt of the tire 3 is controlled to be increased or decreased so as to vary a relative speed between the tire 3 and the test drum 12, thereby to generate a slip between the tire 3 and the test drum 12. A slip ratio Rs representing quantification of this slip has a linear correlation with the tangential force Fx. When the tangential force Fx is 0, the slip ratio Rs is defined to be 0.

According to the embodiment, the drum speed Vd, the tire rotational frequency Nt, the tangential force Fx and the tire load Fz can be read out from the tire driving stiffness measuring apparatus 10, in association with every measurement time point; thus it is possible to calculate the slip ratio Rs based on the drum speed Vd and the tire rotational frequency Nt, in association with every measurement time point. A linear regression is performed on measured data, based on the formula Fx=Kx×Rs+RR used for expressing the relation between the tangential force Fx and the slip ratio Rs in association with every measurement time point, thereby to obtain the tire driving stiffness Kx. At the time of applying the linear regression, the correlation $R^2$ can also be calculated, so that it is possible to determine whether or not the measurement result is normal, which realizes a measurement with a good reproducibility of the tire driving stiffness.

Next, descriptions will be provided on an example of the tire driving stiffness measuring method according to the embodiment of the present invention.

In the tire driving stiffness measuring apparatus 10 of FIG. 1, the tire 3 is rotatably supported to the tire rotational shaft 1. A room temperature where the tire driving stiffness measuring apparatus 10 is installed is conditioned to be 25° C. constantly.

The tire 3, assembled on a wheel, after kept in a test room for four hours or more, is set to the tire driving stiffness measuring apparatus 10, and then the tire 3 is charged with air such that its setup pneumatic pressure becomes 210 kPa (at 25° C.). Hereinafter, if the setup pneumatic pressure from 210 kPa is changed, this is to be mentioned as such.

In the direction in parallel with a line connecting the tire rotational shaft 1 with the drum rotational shaft 14, that is, in the direction from the tire rotational shaft 1 toward the drum rotational shaft 14, by applying a tire load Fz of 400 kgf equivalent to an front wheel at right of an actual vehicle, the ground contact area of the tire 3 is pushed against the test drum 12. In this case, the slip angle and the camber angle are set to be 0°.

While the test drum 12 is rotated at a constant drum speed Vd of 50 km/h, the tire 3 is kept rotating at a constant tire rotational frequency Nt, along with the rotation of the test drum 12. In this condition, a tire warm-up operation is carried out for 30 minutes.

If driving force or braking force is applied to the tire motor 5 while the tire 3 is left rotating along with the test drum 12, the tire rotational frequency Nt becomes increased or decreased so that the tangential force Fx is caused at each time of increasing and decreasing the tire rotational frequency Nt. The rotational speed of the tire 3 relative to the test drum 12 is no longer 0 (zero), and then a slip occurs. Specifically, the tire rotational frequency Nt of the tire 3 is decreased to cause the braking force so as to make the tangential force Fx approximately −900N, and thereafter the tire rotational frequency Nt of the tire 3 is gradually and smoothly increased to cause the driving force so as to make the tangential force Fx approximately 1500N. As described above, the braking force or the driving force applying operation is carried out in sequence, thus the tangential force Fx can be set as continuous values from approximately −900N to approximately 1500N. While increasing or decreasing the tire rotational frequency Nt, the drum speed Vd is controlled to be 50 km/h constantly.

During increasing or decreasing the tire rotational frequency Nt, the drum speed Vd, the tire rotational frequency Nt, the tangential force Fx and the tire load Fz are sample-measured respectively at plural discrete measurement time points. Specifically, the sample-measurement is carried out at a sampling rate of 30 Hz. Therefore, as shown in the number of analysis data, that is, the number of samples of FIG. 3, the sample-measurement is carried out at a rate of 600 to 1200 times. In the sample-measurement, considering variation of the tangential force Fx due to non-uniformity of the tire 3, data from 0.5 to 2.0 rotations of the tire 3 is averaged and analyzed.

Results of each sample-measurement for the drum speed Vd, the tire rotational frequency Nt, the tangential force Fx and the tire load Fz are recorded in association with every measurement time point. The measurement results of the drum speed Vd, the tire rotational frequency Nt, the tangential force Fx and the tire load Fz are Analog/Digital converted and recorded as a text file. The respective measurement results thereof may be recorded on a four-channel data recorder or on a pen recorder with four pens.

According to the tire driving stiffness measuring method of the present embodiment, since the drum speed Vd, the tire rotational frequency Nt, the tangential force Fx and the tire load Fz are recorded respectively in association with every measurement time point, the drum speed Vd, the tire rotational frequency Nt, the tangential force Fx and the tire load Fz can be read out in association with every measurement time point. Accordingly, from the drum speed Vd and the tire rotational frequency Nt recorded at every measurement time points, a slip ratio Rs can be calculated in association with every measurement time point. How to calculate the slip ratio Rs will be described later on. A linear regression is performed on measured data, based on the formula Fx=Kx×Rs+RR used for expressing the relation between the tangential force Fx and the slip ratio Rs in association with every measurement time point, thereby to obtain the tire driving stiffness Kx. At the time of applying the linear regression, the correlation $R^2$ of FIG. 3 can also be calculated, so that it is possible to determine whether or not the measurement result is normal based on a value of the correlation $R^2$. As for a specific example of this determination method, it is possible to realize a measurement of the tire driving stiffness with a good reproducibility. If a value of the correlation $R^2$ is 0.900 or more, it is determined that the measurement result is normal, and if it is less than 0.900, it is determined that the measurement result is abnormal. Abnormal measurement results are removed, and the tire driving stiffness Kx is obtained only from normal measurement results, so that the tire driving stiffness Kx can be measured with preferable reproducibility.

Following the descriptions of the tire driving stiffness measuring method, descriptions will be provided on how to calculate predicted fuel consumption according to the embodiment of the present invention.

First, the drum speed Vd, the tire rotational frequency Nt, the tangential force Fx and the tire load Fz that have been recorded at every measurement time point by using the above tire driving stiffness measuring method are read out, in association with every measurement time point.

Figure 2:
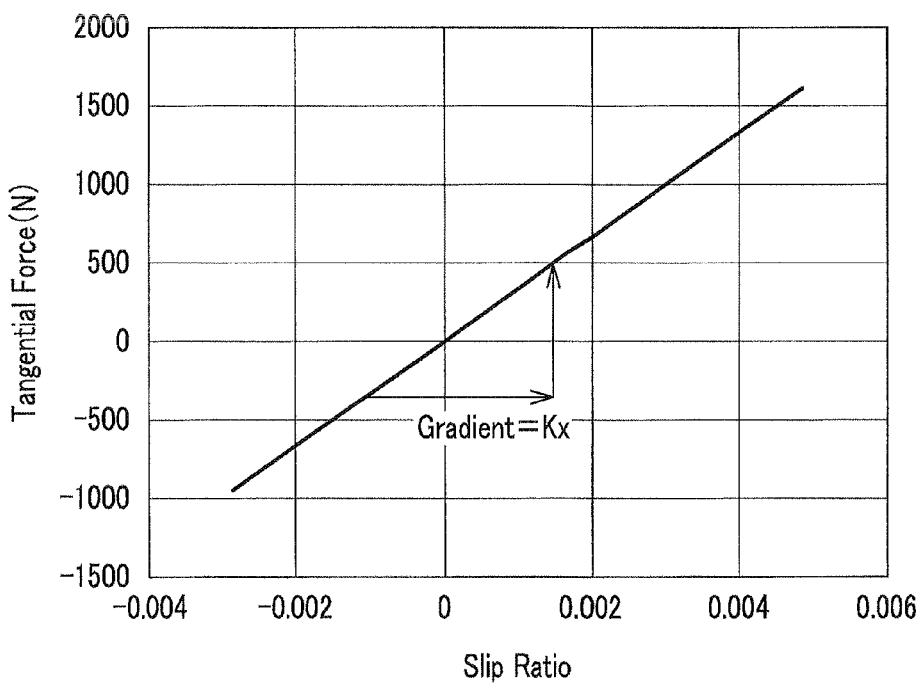
FIG. 2 is a chart showing tangential force relative to slip ratio.

The slip ratio Rs is calculated under a definition that the slip ratio Rs is defined to be 0 if the tangential force Fx is 0. After the braking force is generated due to the tangential force Fx caused by decreasing the tire rotational frequency of the tire 3, the driving force is generated due to the tangential force Fx caused by gradually and smoothly increasing the tangential force Fx. In other words, the slip ratio Rs at a position of Fx=0 where Fx is changed from minus to plus is defined to be Rs=0. Specifically, at every measurement time point, the slip ratio Rs is calculated based on the drum speed Vd and the tire rotational frequency Nt, and also based on a ratio N0/V0 between the drum speed V0 and the tire rotational frequency N0 when the tangential force Fx is 0 (zero). When the linear regression is performed on measured data, based on the formula: Fx=A0×Vd/Nt+B0 used for expressing the relation of Fx and Vd/Nt, the relation becomes N0/V0=−A0/B0 if Fx=0, and the slip ratio Rs is calculated for the drum speed Vd and the tire rotational frequency Nt at every measurement time point by using the formula: Rs=1−(N0/V0)×(Vd/Nt). From the slip ratio Rs and the tangential force Fx measured at every measurement time point, a chart regarding the tangential force Fx and slip ratio Rs can be generated as shown in FIG. 2.

The linear regression is performed on measured data, based on the linear function: Fx=Kx×Rs+RR used for expressing the relation of the tangential force Fx and the slip ratio Rs in association with every measurement time point, thereby to obtain the tire driving stiffness Kx equivalent to the gradient of this linear function. Specifically, 203455 is obtained as the tire driving stiffness Kx in FIG. 3. The above measurement process to find the tire driving stiffness Kx is set as one measurement cycle, and eight measurement cycles are carried out per test on the tire 3. Therefore, the chart of FIG. 2 is supposed to be generated eight times in each test on the tire 3.

The tire driving stiffness Kx is divided by an average of the tire loads Fz measured at every measurement time point, so as to obtain a Kx coefficient. This Kx coefficient is calculated at every measurement cycle, therefore, eight Kx coefficients are obtained in eight measurement cycles. Among eight Kx coefficients, six Kx coefficients excluding a maximum value and a minimum value are averaged to set as a Kx coefficient corresponding to the tire 3 of interest. Specifically, the average value 50.9 of the six Kx coefficients for six measurement cycles excluding 54.96 which is the seventh Kx of the maximum value and 47.96 which is the second Kx of the minimum value is set as a representative Kx coefficient of the tire 3 of interest. According to the above mentioned method, it is possible to enhance reproducibility and accuracy of the measurements.

In FIG. 4, the above measurement cycle is recurrently carried out on different tires 3 from A to k, for each of which a Kx coefficient is calculated. In FIG. 4, for the purpose of simplifying comparison among the tires A to K, the Kx coefficient of the tire B is assumed as a reference value, and the Kx index of the tire B is set to be 100. A percentage of each Kx coefficient of the other tires A and C to K relative to the Kx coefficient of the tire B is calculated respectively as a Kx index for each of the other tires A and C to K. A rolling resistance coefficient (RRC) for each of the tires A to K is found by using a measurement method complying with ISO/SAE, so as to obtain actually measured fuel consumption by vehicle Ms for each of the tires A to K. In this case, the RRC of the tire B is assumed as a reference value and the RRC index of the tire B is set to be 100, and then a RRC index for each of the other tire A and C to K relative to the RRC of the tire B is calculated.

Figure 5:
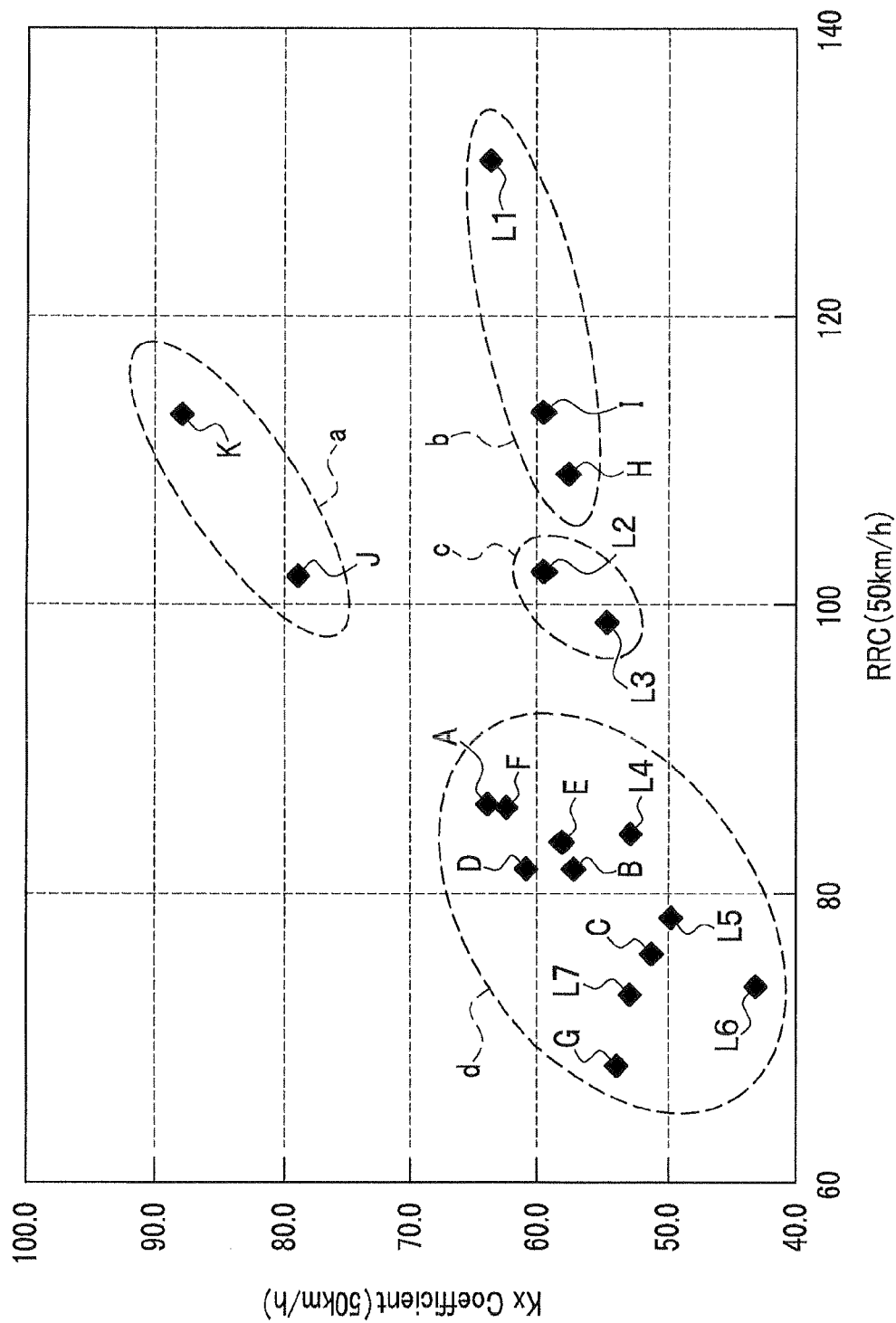
FIG. 5 is a dispersion chart of Kx coefficients and RRCs obtained for each of the different tires.

FIG. 5 is a dispersion diagram of Kx coefficients and RRCs found for each of the tires A to K. FIG. 5 also shows additional tires L1 to L7 of different types. It has been found that in the region d, there are dispersed the tires A to G and L4 to L7, which are so called a "normal tire". It has been found that in the region c, there are dispersed the tires L2 and L3, which have a so called "tire profile" of 80. It has been also found that in the region b, there are dispersed the tires H, I and L1, which are a so called "low profile tire". It has been also found that in the region a, there are dispersed the tire J (with a pneumatic pressure of 170 kPa) and the tire K (with a pneumatic pressure of 140 kPa), which are of a low pneumatic pressure type.

Figure 6:
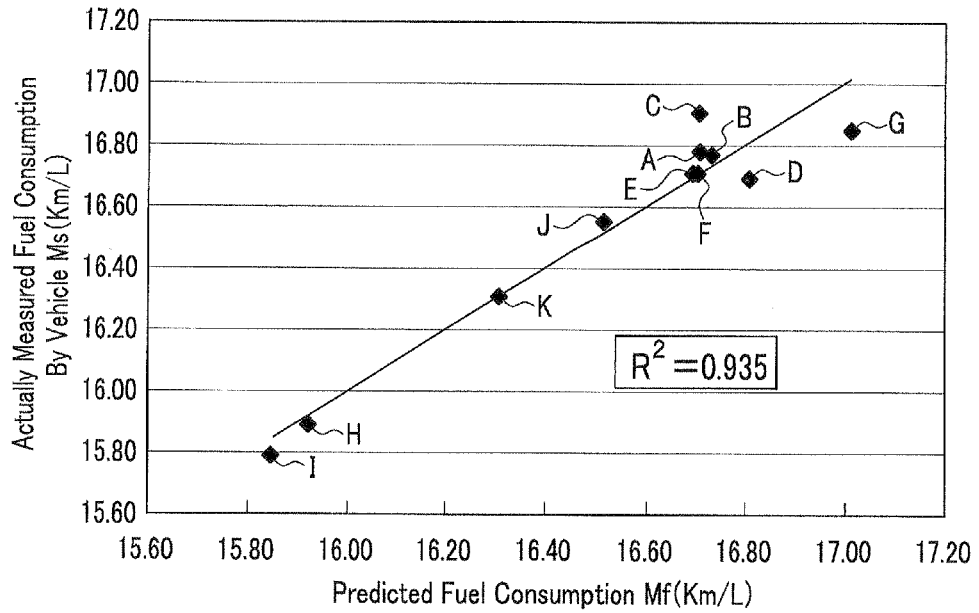
FIG. 6 is a correlation chart between actually measured fuel consumption by vehicle for each of the different tires and predicted fuel consumption calculated for each of the different tires by using the calculation method for prediction of fuel consumption according to the present embodiment.

The linear regression is performed on measured data, based on the formula: Ms=a×RRC+b/(Kx coefficient)+c used for expressing the relation of the Kx coefficient and the RRC calculated for each of the tires A to K with the actually measured fuel consumption by vehicle Ms for each of the tires A to K, thereby to determine coefficients a, b and c. In this case, the correlation $R^2$ is 0.935 as shown in FIG. 6, which shows a strong correlation. In FIG. 6, the Kx coefficients, the RRC and the coefficients a, b, c determined for each of the tires A to K are substituted into the formula: Mf=a×RRC+b/(Kx coefficient)+c, so as to find the predicted fuel consumption Mf for each of the tires A to K. It is obvious that the predicted fuel consumption Mf and the actual measured fuel consumption by vehicle Ms preferably agree with each other.

If it is desired to find the predicted fuel consumption Mf for a new tire, coefficients a, b, c may be determined from the above Kx coefficient and the above RRC, and the determined coefficients a, b, c are substituted into the formula: Mf=a×RRC+b/(Kx coefficient)+c, thereby to obtain the predicted fuel consumption Mf.

Figure 7:
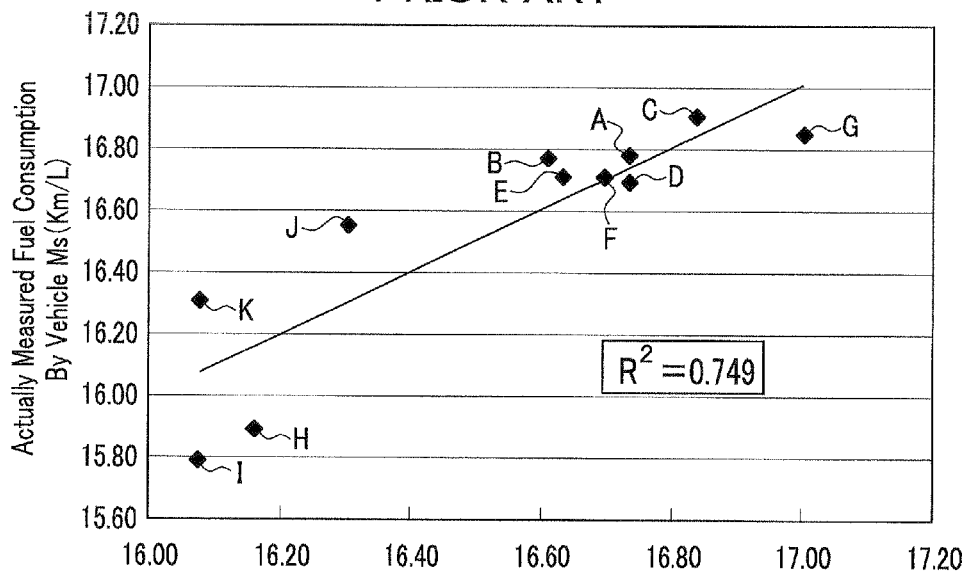
FIG. 7 is a correlation chart between actually measured fuel consumption by vehicle for each of the different tires and predicted fuel consumption calculated for each of the different tires by using a conventional calculation method for prediction of fuel consumption.

FIG. 7 shows a conventional case of using a formula: Mf=a×RRC+c, which does not consider the Kx coefficient. In this case, the correlation $R^2$ is 0.749, which reveals that an accurate predicted fuel consumption Mf cannot be obtained. To the contrary, according to the present embodiment shown in FIG. 6, it is possible to calculate the predicted fuel consumption Mf with high accuracy.

The invention claimed is:

1. A tire driving stiffness measuring apparatus comprising:
 a tire rotational shaft that rotatably supports a tire assembled on a wheel;
 a tire motor for increasing or decreasing a tire rotational frequency while the tire is being rotated;
 a rotational frequency measuring means for measuring the tire rotational frequency;
 a test drum for rotating around a drum rotational shaft that is parallel to the tire rotational shaft;
 a drum motor for rotating the test drum at a constant drum speed;
 a speed meter for measuring the drum speed;
 a load applying means for pushing the tire against the test drum with a tire load applied in a direction from the tire rotational shaft toward the drum rotational shaft;
 a radial force load cell for measuring the tire load;
 an tangential force load cell for measuring an tangential force that is exerted on the tire in a direction orthogonal to both a direction from the tire rotational shaft toward the drum rotational shaft and a direction of the tire rotational shaft; and
 a recording means for recording a measurement result of each of the drum speed, the tire rotational frequency, the tangential force and the tire load,
 the tangential force being generated by increasing or decreasing the tire rotational frequency while the tire load is being applied against the tire, and
 during increasing or decreasing the tire rotational frequency, the drum speed, the tire rotational frequency, the tangential force and the tire load being measured respectively at plural discrete measurement time points, and the measured results thereof being recorded respectively in association with every measurement time point thereof.

2. A tire driving stiffness measuring method comprising:
 rotatably supporting a tire around a tire rotational shaft;
 pushing the tire against a test drum with a tire load applied in a direction from the tire rotational shaft toward the drum rotational shaft that is parallel to the tire rotational shaft; the test drum rotatably supported around the drum rotational shaft;
 rotating the test drum at a constant drum speed;
 increasing or decreasing a tire rotational frequency while the tire is left rotating along with the test drum so as to generate an tangential force;
 during increasing or decreasing the tire rotational frequency, measuring the drum speed, the tire rotational frequency, the tangential force and the tire load respectively at plural discrete measurement time points; and
 recording the measured results thereof respectively in association with every measurement time point.

3. The tire driving stiffness measuring method according to the claim 2,
 wherein
 the method is carried out for a plurality of the tires of different types respectively, and the drum speed, the tire rotational frequency, the tangential force Fx and the tire load are read out respectively in association with every measurement time point;
 for each of the tires of different types, a slip ratio Rs for each of the tires of the different types is calculated from the drum speed and the tire rotational frequency in association with every measurement time point;
 for each of the tires of different types, a linear regression is performed on measured data, based on a formula: $Fx = Kx \times Rs + RR$ used for expressing a relation between the tangential force Fx and the slip ratio Rs in association with every measurement time point, so as to obtain a tire driving stiffness Kx;
 for each of the tires of different types, the tire driving stiffness Kx is divided by an average of the tire load at every measurement time point, so as to calculate a Kx coefficient;
 for each of the tires of different types, an actually measured fuel consumption by vehicle Ms is measured through an actual measurement;
 for each of the tires of different types, a linear regression is performed on measured data, based on a formula: $Ms = a \times RRC + b/(Kx\ coefficient) + c$ used for expressing a relation of the calculated Kx coefficient and a rolling resistance coefficient RRC obtained by a method complying with ISO/SAE with an actually measured fuel consumption by vehicle Ms, thereby to determine coefficients a, b, c;
 the Kx coefficient and the rolling resistance coefficient RRC is calculated for a new tire; and
 the Kx coefficient and the rolling resistance coefficient RRC obtained for the new tire, and the determined coefficients a, b, c are substituted into a formula: $Mf = a \times RRC\ b/(Kx\ coefficient) + c$ respectively, so as to calculate a predicted fuel consumption Mf for the new tire.

* * * * *